United States Patent
Sheridon

[11] Patent Number: 5,956,005
[45] Date of Patent: Sep. 21, 1999

[54] ELECTROCAPILLARY DISPLAY SHEET WHICH UTILIZES AN APPLIED ELECTRIC FIELD TO MOVE A LIQUID INSIDE THE DISPLAY SHEET

[75] Inventor: Nicholas K. Sheridon, Los Altos, Calif.

[73] Assignee: Xerox Corporation, Stamford, Conn.

[21] Appl. No.: 08/872,264

[22] Filed: Jun. 10, 1997

Related U.S. Application Data

[63] Continuation-in-part of application No. 08/581,136, Dec. 29, 1995, abandoned.

[51] Int. Cl.$^6$ .............................. G09G 3/34; G02B 26/02
[52] U.S. Cl. ............................ 345/84; 345/107; 359/228
[58] Field of Search ................................ 345/107, 55, 48, 345/60, 49, 84, 30; 359/223, 228, 291, 296; 430/37, 38

[56] References Cited

U.S. PATENT DOCUMENTS

| | | | |
|---|---|---|---|
| 3,648,269 | 3/1972 | Rosenweig et al. | 359/228 |
| 3,863,249 | 1/1975 | Olah | 340/815.44 |
| 3,972,595 | 8/1976 | Romankiv et al. | 359/228 |
| 4,076,387 | 2/1978 | Hass et al. | 359/296 |
| 4,079,368 | 3/1978 | Distefano | 359/291 |
| 4,203,106 | 5/1980 | Dalisa et al. | 345/107 |
| 4,402,062 | 8/1983 | Batchelder | 345/107 |
| 4,418,346 | 11/1983 | Batchelder | 345/107 |
| 4,583,824 | 4/1986 | Lea | 359/228 |
| 4,636,785 | 1/1987 | Le Pesant | 359/228 |
| 5,247,290 | 9/1993 | Di Santo et al. | 345/107 |
| 5,389,945 | 2/1995 | Sheridon | 345/107 |
| 5,402,145 | 3/1995 | DiSanto et al. | 345/107 |

OTHER PUBLICATIONS

Xerox Disclosure Journal, vol. 4, No. 3, May/Jun. 1979, pp. 385–386.

*Primary Examiner*—Jeffery Brier
*Assistant Examiner*—Paul A. Bell
*Attorney, Agent, or Firm*—Fariba Rad

[57] ABSTRACT

There is disclosed an electrocapillary display sheet which utilizes three transparent sheets being spaced from each other and placed parallel to each other. The medial sheet has a plurality of reservoirs which are filled with a dyed or pigmented ink. Each of the reservoirs has an individually addressable voltage source to create an individual electric field. By activating each electric field, the ink from the corresponding reservoir flows out into the space between the medial sheet and one of the other two sheets in order to create a pixel. By removing the electric filed, the liquid which had created a pixel will retreat back into the reservoir.

16 Claims, 8 Drawing Sheets

ELECTROCAPILLARY DISPLAY SHEET WHICH UTILIZES AN APPLIED ELECTRIC FIELD TO MOVE A LIQUID INSIDE THE DISPLAY SHEET

This application is a continuation-in-part of U.S. patent application Ser. No. 08/581,136, filed Dec. 29, 1995, now abandoned Sep. 9, 1997.

BACKGROUND OF THE INVENTION

This application relates to U.S. patent application Ser. No. 08/581,138, "Capacitive Energy Display Sheet" Attorney Docket No. D/95550Q1 (Common Assignee) filed concurrently.

This invention relates to field induced display sheets and more particularly concerns an electrocapillary display sheet which utilizes a dyed polar liquid in a plurality of reservoirs in which the dyed polar liquid can be moved from each reservoir into an open space and can be moved back into the reservoir by applying an electric field to the dyed polar liquid and removing the electric field from the dyed polar liquid respectively.

Typically, a display device, in sheet form, comprises a thin sheet which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to make a field induced display sheet such as U.S. Pat. No. 4,126,854 titled "Twisting Ball Panel Display" in which the display panel is comprised of a plurality of spherical particles which have different colors on each hemisphere. Depending on the direction of an electric field applied to each spherical particle, one of the hemispheres will be displayed. In this approach, for black and white display sheets, each ball has a black hemisphere and a white hemisphere. The black and white hemispheres of the spherical particles can be selected in such a manner to display a desired image or text.

It is an object of this invention to provide a different approach to make a field induced display sheet.

SUMMARY OF THE INVENTION

There is disclosed an electrocapillary display sheet which utilizes two transparent sheets being spaced from each other and placed parallel to each other to create a passage. The second sheet has a reservoir which is filled with a conductive liquid. The first sheet has an electrode which is insulated from the liquid by an insulating layer. The second sheet also has an electrode which is insulated from the liquid by an insulating layer. The electrode of the second sheet is associated with the reservoir. In addition, the first sheet has a conducting means which is in contact with the liquid in the reservoir for providing electrical contact to the ink By activating the electrode of the first sheet, the electrode of the second sheet and the conducting means, an electric field will be generated which will cause the liquid from the reservoir to flow into the passage.

In accordance with another embodiment of this invention, there is disclosed an electrocapillary display sheet which utilizes two transparent sheets being spaced from each other and placed parallel to each other to create a passage. The second sheet has a plurality of reservoirs which are filled with a conductive liquid. The first sheet has a plurality of electrodes which are insulated from the liquid by an insulating layer. The second sheet also has a plurality of electrodes which are insulated from the liquid by an insulating layer. Each one of the plurality of electrodes of the second sheet is associated with one of the plurality of reservoirs. In addition, the first sheet has a plurality of conducting means each of which is in contact with the liquid in one of the plurality of reservoirs for providing electrical contact to the liquid. By activating one of the electrodes of the first sheet, a corresponding electrode of the second sheet and a corresponding conducting means, an electric field will be generated which will cause the liquid from a corresponding reservoir to flow into the passage.

In accordance with yet another embodiment of this invention, there is disclosed an electrocapillary display sheet which utilizes three transparent sheets being spaced from each other and placed parallel to each other to create a first passage and a second passage. The medial sheet has a plurality of first type holes which are filled with a conductive liquid. The medial sheet also has a plurality of second type holes. The first passage, the second passage and the second type holes are filled with a fluid. The first sheet has a plurality of electrodes which are insulated from the liquid by an insulating layer. The medial sheet also has a plurality of electrodes which are insulated from the liquid by an insulating layer. Each one of the plurality of electrodes of the medial sheet is associated with one of the plurality of first type holes. In addition, the first sheet has a plurality of conducting means each of which is in contact with the liquid in one of the plurality of first type holes for providing electrical contact to the liquid. By activating one of the electrodes of the first sheet, a corresponding electrode of the medial sheet and a corresponding conducting means, an electric field will be generated which will cause the liquid from a corresponding reservoir to flow into the passage and displace the fluid.

DETAILED DESCRIPTION OF THE INVENTION

Figure 1:
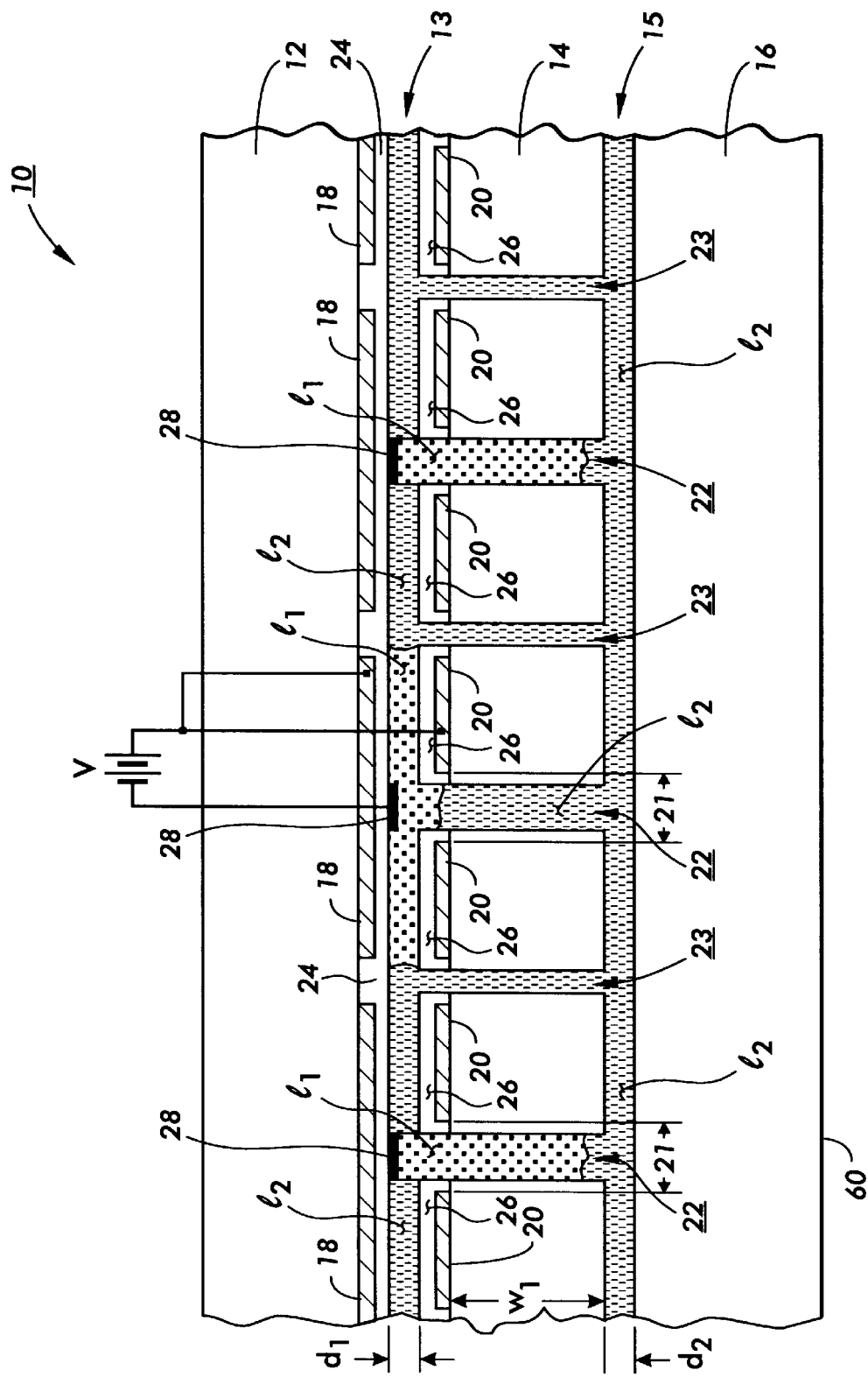
FIG. 1 shows a cross sectional view of an electrocapillary display sheet of this invention.

Referring to FIG. 1, there is shown a cross sectional view of an electrocapillary display sheet 10 of this invention. The electrocapillary display sheet 10 comprises three transparent and insulating sheets 12, 14 and 16 such as glass or Mylar. Sheets 12, 14 and 16 are substantially parallel to each other and they are spaced from each other. The distance $d_1$ between sheet 12 and 14 and the distance $d_2$ between the sheets 14 and 16 both are in the range between 0.0001 and 0.05 inches. Hereinafter, for the purpose of simplicity, "electrocapillary display sheet" will be referred to as "display sheet".

Figure 2:
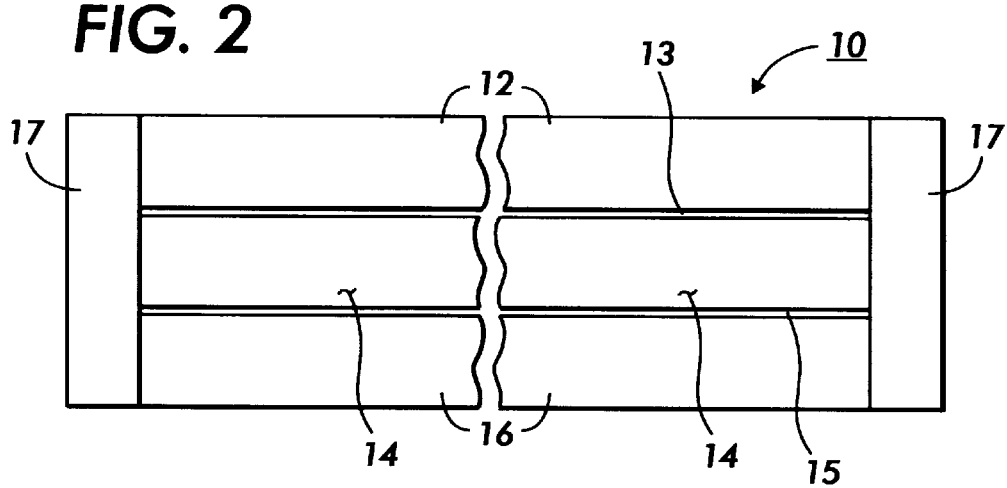
FIG. 2 shows an example of a method of bonding different sheets of FIG. 1 together.

Referring to FIG. 2, there is shown an example of a method of bonding sheet 12, 14 and 16 together. The sheets 12, 14 and 16 are suitably spaced from each other and bonded to a frame 17 that runs around the periphery of the display sheet 10. If the frame 17 and the sheets 12, 14 and 16 are glass, bonding might be done by means of a glass frit painted onto joining surfaces and subsequently heated to its melting temperature. The bonding might also be done with epoxy or some other bonding resin. If the sheets 12, 14 and 16 are all made of a plastic material, such as Teflon or mylar, the bonding might be a heat weld, accomplished by means well known in the art.

Since the frame 17 runs around the periphery of the display sheet 10, it seals the spaces 13 and 15 which are located between sheets 12 and 14 and sheets 14 and 16 respectively.

Referring back to FIG. 1, a plurality of electrodes 18 are placed on sheet 12 where it faces sheet 14 and a plurality of electrodes 20 are placed on sheet 14 where it faces sheet 12. Electrodes 18 and 20 generally must be made from a transparent material such as Indium/tin oxide (ITO) or tin oxide. Electrodes 18 and 20 can be selected to have different shapes such as square or circular. However, the shape of both electrodes 18 and 20 have to be selected to be identical. In the preferred embodiment of this invention, both electrodes 18 and 20 are selected to be square with rounded corners. Each one of the electrodes 18 of sheet 12 is aligned with a corresponding electrode 20 from sheet 14.

Figure 3:
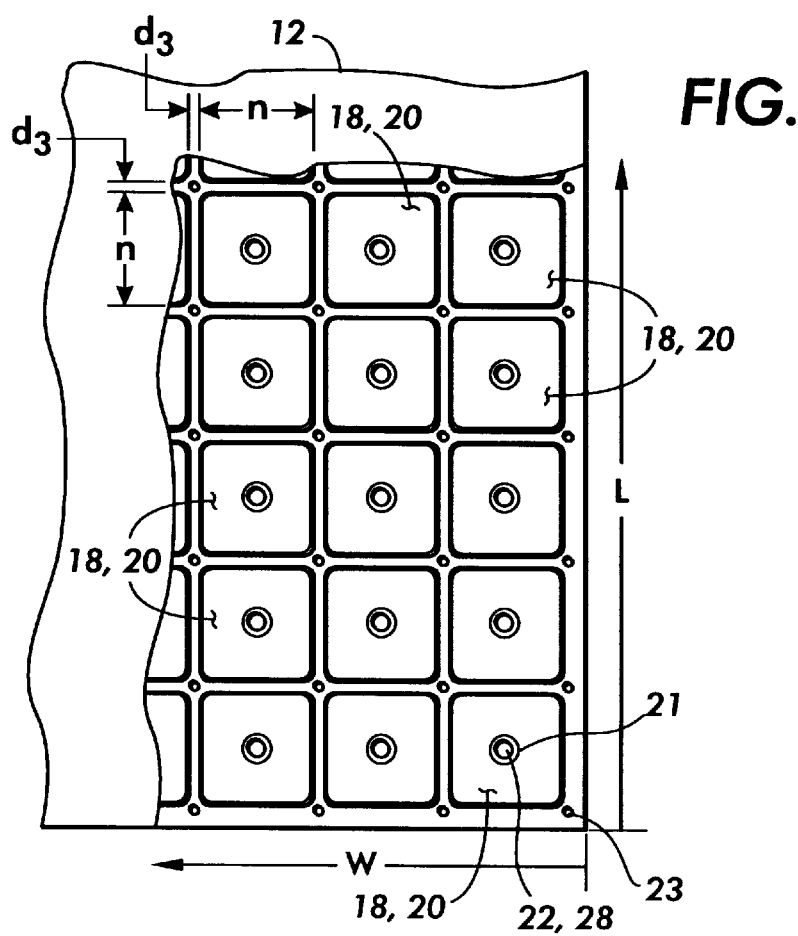
FIG. 3 shows a portion of the top view of the electrocapillary display sheet of FIG. 1.

Referring to FIG. 3, there is shown a portion of the top view of the electrodes 18 of sheet 12. The electrodes 18 of sheet 12 are placed next to each other in such a manner that they form parallel lines both along the width W and the length L of the surface of sheet 12. The electrodes 18, of dimension n by n, are placed at a distance $d_3$ away from each other. Since each electrode has the same size as the size of a pixel, the dimension n is defined by the size of the pixels. Distance $d_3$ is in the range between 0.001n and 0.05n. Electrodes 20 of the sheet 14 have the same shape, size and arrangement as the electrodes 18 of sheet 12. Each electrode 20 has an opening at its center shown by circle 21 which is visible through the transparent electrode 18. The opening 21 can have any shape other than a circle.

Referring back to FIG. 1, sheet 12, where faces sheet 14, has a layer 24 of low surface energy insulator. The low surface energy insulator layer 24, which is placed over the electrodes 18 of the sheet 12, covers the entire surface of the sheet 12. In the same manner, a low surface energy insulator layer 26, is placed over the electrodes 20 of the sheet 14. The low surface energy insulator layers 24 and 26 may be a layer of Teflon (DuPont Co.) or other perfluorinated polymer, bonded to the sheets 12 and 14 as a sheet or deposited by a sputtering or chemical vapor deposition process. They can also be a silicone elastomer such as Sylgard 184 manufactured by the Dow Corning Co. Furthermore, they may be a two or more layer structure such as Parylene (a product of the Union Carbide Co.) overcoated with a perfluorinated polymer such as Fluorad FC725 manufactured by the 3M Co.

Sheet 14 has a plurality of reservoirs (storage to hold liquid) 22. The reservoirs 22 are created by forming a hole, through the insulating layer 26 and the sheet 14 within the opening 21 of each electrode 20. The diameter or the size of the opening of each reservoir is smaller than the diameter or the size of the opening 21 of each electrode 20 in such a manner that once reservoirs 22 are created, the electrodes 20 are not exposed to their respective reservoir. Each reservoir extends through the thickness $W_1$ of the sheet 14. In addition, sheet 14 has a plurality of holes 23 which are formed to extend through the insulating layer 26 and the thickness $W_1$ of sheet 14 preferably where there is a space between four adjacent electrodes 20 of sheet 14. However, holes 23 can be placed at any location, where there is no electrodes 20. Holes 23 provide a communicating path between the sealed spaces 13 and 15.

In addition, a plurality of high surface energy plates 28 made from a material such as evaporated or sputtered gold, platinum, indium/tin oxide, or nickel are placed over the low surface energy insulator layer 24 of the sheet 12 only on the areas which are aligned to be above the reservoirs 22 of the sheet 14. In the preferred embodiment of this invention, the shape of the high surface energy plates 28 is the same as the shape of the cross section of the reservoirs which is a circle.

It should be noted that the electrodes 18 and 20, and the low surface energy insulators 24 and 26 are all transparent. The high surface energy plates 28 may also be transparent.

The reservoirs 22 are filled with dyed polar liquid $l_1$ such as water, alcohol, acetone, formamide, ethylene glycoy and mixtures of these and other suitable liquids.

The space (passage) 15 between the sheets 14 and 16, the space (passage) 13 between the sheets 12 and 14 and the holes 23 are filled with a low surface energy liquid $l_2$ such as Dow Corning 200 Series silicone oil, Exxon Isopar or 3M Fluorinert. The two liquids $l_1$ and $l_2$ are immiscible. The liquid $l_2$ may be clear, dyed or pigmented with a contrasting color to liquid $l_1$. The spaces 13, 15 and holes 23 may also be filled with a gas such as air.

Conductive liquids are polar and are generally miscible with one another. However, there are classes of non-conducting liquids that are not miscible with one another. Examples of these are the fluorocarbons, such as the 3M Fluorinerts, that are not miscible with most of the hydrocarbons, Dow Coming FS-1265 oil is also not soluble in hydrocarbons or the 3M Fluorinerts.

The dyed polar liquid $l_1$ in each reservoir adheres to the high surface energy plates 28 above the reservoir. The high surface energy plate 28 not only serves the purpose of maintaining the placement of the conductive liquid adjacent to the addressing electrodes 18 and 20, but also serves as a means of making electrical connection to the conductive liquid $l_1$. Since the high surface energy plates 28 provide electrical connection to liquid $l_2$, hereinafter, "the high surface energy plate" will be referred to as "connection plate".

This invention is based on a concept called "electrocapillarity". The electrocapillarity relates to changes in surface tension as a function of an applied electric field which is discussed in 'Surface Chemistry', by Lloyd I. Osipow, 1962, Reinhold Publishing Co., New York". The structure shown in FIG. 1 is designed to move the dyed polar liquid $l_1$ from one area into another by using effects related to the electrocapillary concept.

Figure 4:
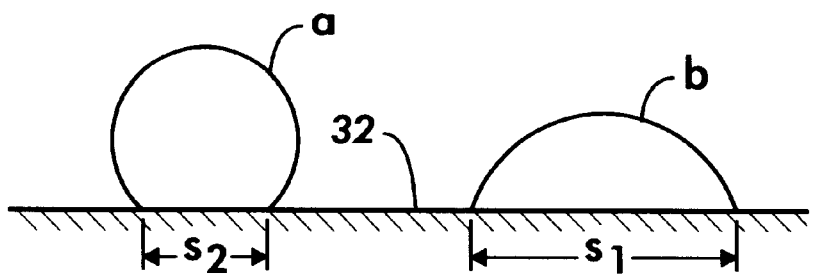
FIG. 4 shows two same size droplets a and b of two different kinds of liquid on a surface.

In order to comprehend the disclosed embodiment of this invention, it is necessary to study the electrocapillary concept. Referring to FIG. 4, there are shown two same size droplets a and b of two different kinds of liquid on a surface 32. As it can be observed, droplet b is spread out and droplet a is beaded up. As a result, droplet b occupies a larger surface area $S_1$ than the surface area $S_2$ which the droplet a occupies. The reason for the different surface areas of the two liquids is that each liquid has a certain energy relationship with the surface which results in a specific contact angle with respect to a given surface. The lower the interaction energy between the liquid and the surface, the larger the contact angle and the less the shared area.

Figure 5:
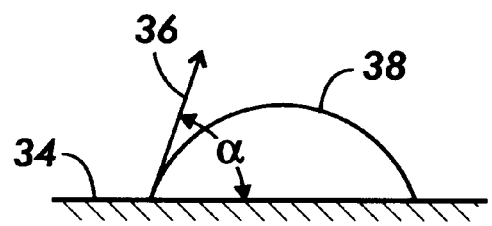
FIG. 5 shows the contact angle of a droplet of a liquid with respect to a surface.

Referring to FIG. 5, a contact angle α is an angle between the plane 34 of a surface and the tangent line 36 of a droplet 38 of a liquid. The contact angle of each liquid with respect to a given surface depends on the properties of that liquid for example, surface tension and the properties of the surface for example, surface energy.

Figure 6:
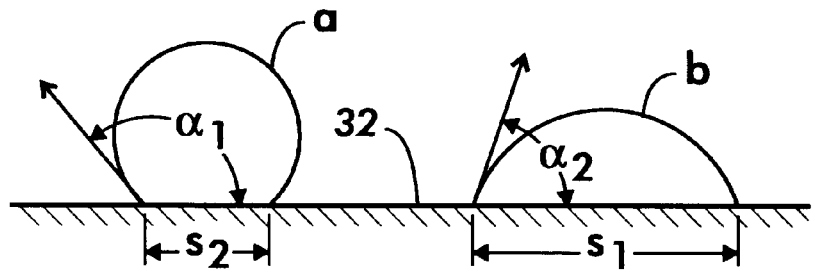
FIG. 6 shows the two droplets a and b of FIG. 4 with their contact angles $\alpha 1$ and $\alpha 2$.

Referring to FIG. 6, there is shown the two droplets a and b of FIG. 4 with their contact angles $\alpha_1$ and $\alpha_2$. Some liquids such as the liquid of droplet b have an acute contact angle $\alpha_2$ which causes the droplet of that liquid to occupy a large surface $S_1$. However, some liquids such as the liquid of droplet a have an obtuse contact angle $\alpha_1$ which causes a same size droplet of one of these liquids to occupy a much smaller surface $S_2$ than the surface area $S_1$ occupied by liquids with acute contact angles.

Figure 7:
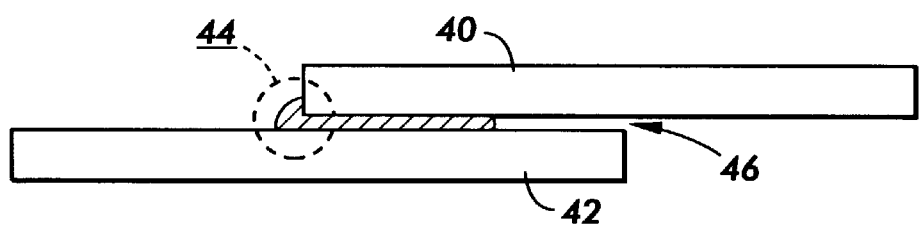
FIG. 7 shows a droplet of a liquid which spreads into a space created by two parallel plates.
Figure 8:
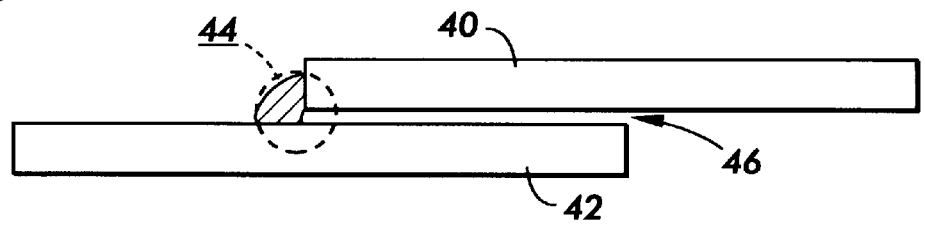
FIG. 8 shows a droplet of a liquid which does not spread into a space created by two parallel plates.

Referring to FIG. 7, there is shown two plates 40 and 42 which are placed parallel and spaced from each other in such a manner as to create a step. Through extensive experiments, it has been determined that if a droplet of a liquid which has a contact angle less than about 95 degrees is placed in the corner 44 created by the step, the droplet will spread into the space 46 between the two parallel plates 40 and 42. However, referring to FIG. 8, if the droplet of a liquid which has a contact angle above about 95 degrees is placed at corner 44, the droplet will not spread.

Figure 9:
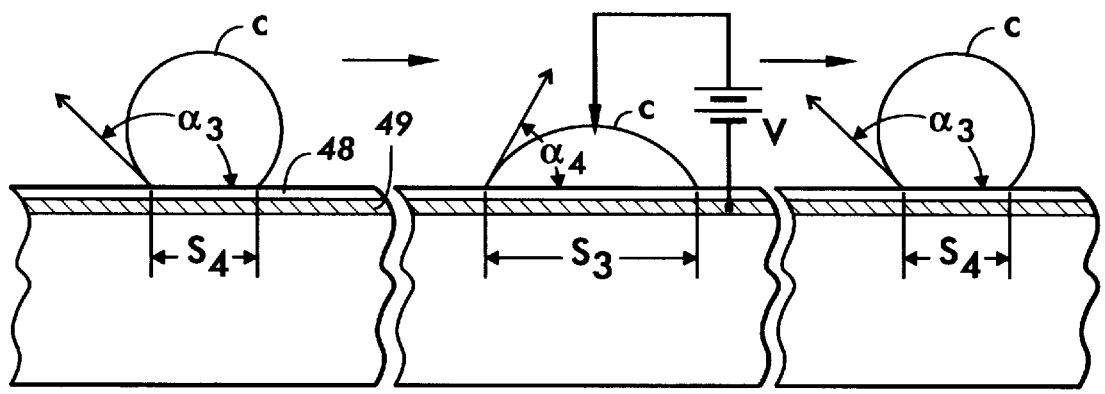
FIG. 9 shows that by applying a voltage to the droplet of a liquid, the contact angle of the droplet can be changed.

Furthermore, referring to FIG. 9, through extensive experiments it has been determined that by applying a voltage V between a droplet c located on a thin insulative surface 48 and an electrode 49 (directly under the surface 48) an electric field is created which causes, the contact angle to be changed and, depending on the voltage applied to the liquid, the contact angle can be modified to a desired angle.

In FIG. 9, from left to right, droplet c is shown prior to applying a voltage V, during application of a voltage V and after removal of the voltage V. As can be observed, prior to applying a voltage V the droplet c is beaded up and has an obtuse angle α3. During the application of the voltage V, the contact angle of droplet c changes to an acute angle $\alpha_4$ and as a result, the droplet expands. After removal of the voltage V, the contact angle of the droplet changes to its original obtuse angle $\alpha_3$ and as a result the droplet beads up again.

It should be noted that if the voltage is turned off, the charges remain in the droplet and the electrodes, as a result, the droplet will remain spread. However, if the droplet and the electrodes are discharged, then the liquid will bead up. In this specification the term "electric field is removed" shall mean "the liquid, its corresponding electrodes and electrical connection means to the liquid are discharged".

Modifying a contact angle from an obtuse angle $\alpha_3$ to an acute angle $\alpha_4$ causes the droplet c to occupy a larger surface area $S_3$ than its original surface area $S_4$ (the surface that a droplet occupies prior to the application of an electric field). Once the voltage is removed, the droplet c will contract back to its original shape and surface area $S_4$. The experiments have shown that by applying a voltage V to liquids such as water and mercury on a surface such as silicone elastomer that overcoat a conductor, their surface areas can increase by a factor of 10. Furthermore, by utilizing surfaces such as Teflon coated Parylene, the surface areas of water or mercury can increase by a factor in the range between 20 and 30.

The concept of increasing the surface area of a liquid by applying a voltage has been used in this invention to expand the surface area of a dyed liquid in order to fill a surface area on demand.

In the preferred embodiment of this invention, the contact angle of the dyed polar liquid 11 with respect to the low surface energy insulator is selected to be more than 90 degrees. It is well known that the contact angle of a first liquid with respect to a surface is greatly enhanced if a second liquid, with a lower surface tension and immiscible with the first liquid, is present. This phenomenon is shown in FIGS. 10 and 11.

Figure 10:
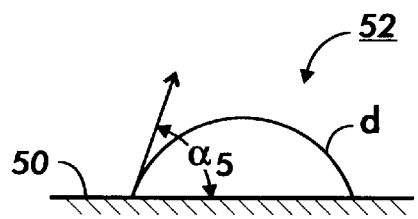
FIG. 10 shows a droplet which is surrounded by air and has an acute contact angle.
Figure 11:
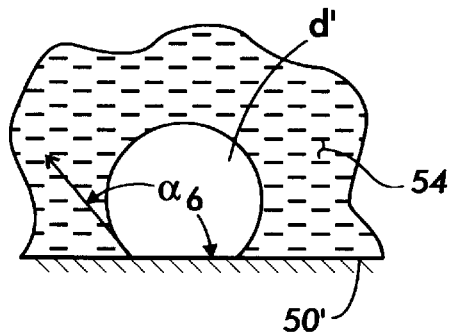
FIG. 11 shows the same droplet of FIG. 10 which is surrounded by a different liquid and now has an obtuse angle.

In FIG. 10, a droplet d of a liquid is placed on surface 50. The droplet d which is surrounded by air 52 has an acute contact angle $\alpha_5$. However, in FIG. 11, droplet d' which is the same as the droplet d of FIG. 10 is surrounded by a different liquid 54 and placed on the surface 50' which is the same as surface 50 of FIG. 10. In FIG. 11, as can be observed, liquid 54 has caused the droplet d' to have an obtuse angle $\alpha_6$. This effect can be utilized to greatly increase the number of polar liquid/low energy surface combinations which is very useful in the practice of this invention.

Referring back to FIG. 1, in operation, an individual voltage source which generates a voltage V is applied to each pair of electrodes 18 and 20 and to their corresponding liquid $l_1$ through the connection plate 28. It should be noted that for the purpose of simplicity, only the connection of one pair of electrodes 18 and 20 and their corresponding connection plate 28 to a voltage V is shown. However, it should be noted that an individually addressable electric field is applied to each pair of electrodes 18 and 20 and their corresponding connection plate 28. When an individual voltage V is applied to electrodes 18 and 20 and their corresponding connection plate 28 an electric field is being generated between the electrodes 18 and 20 (electrodes 18 and 20 are activated) and their corresponding connection plate 28.

The voltage V can be either DC or AC. In the case of a DC voltage V, electrodes 18 and 20 are connected to the same polarity of the voltage V and the connection plate 28 is connected to the opposite polarity of the voltage V. Therefore, liquid 11, which receives its electrical connection through the connection plate 28, has the opposite polarity compared to the polarity of the electrodes 18 and 20.

In operation, once the voltage V is activated, the contact angle of the polar liquid $l_1$ with respect to the surfaces of the low surface energy insulators 24 and 26 decreases. It should be noted that low surface energy insulators 24 and 26 are over the electrodes 18 and 20 respectively. Therefore, the opposite polarity of liquid $l_1$ with respect to the polarity of the electrodes 18 and 20 directly under the low surface energy insulators 24 and 26 causes the contact angle of polar liquid $l_1$ to decrease. The decrease in the contact angle causes the polar liquid $l_1$ to be pumped into the space 13 between sheets 12 and 14.

The dyed polar liquid $l_1$ occupies the space 13 only within the perimeters of the electrodes 18 and 20. As the expanding liquid $l_1$ approaches the perimeters of the electrodes 18 and 20, the strength of the electric field between this liquid $l_1$ and the electrodes 18 and 20 falls off, causing the contact angle of liquid $l_1$ with respect to the surfaces of the low surface energy insulators 24 and 26 to increase. This increase in contact angle will cause the further expansion of the liquid to cease.

When the liquid $l_1$ moves into the space 13, it causes the liquid $l_2$ in the space 13, holes 23 and the space 15 to move and flow into the reservoirs 22 from the opening of the reservoir into the space 15 in order to equilibrate the liquid $l_1$ and the liquid $l_2$.

Once a voltage V is activated, the dyed polar liquid $l_1$ occupies the area between electrodes 18 and 20 and therefore the area between electrodes 18 and 20 will be seen as a colored pixel or subpixel. By removing the electric field created by the voltage V, the contact angle of the liquid $l_1$ with respect to the surfaces of the low surface energy insulators 24 and 26 increases, causing the dyed polar liquid $l_1$ to retreat back to the reservoir where it adheres only to the connection plate 28 which it wets. Once an electric field is removed, since the dyed polar liquid retreats back to the reservoir, the area under that electrode will be seen as a clear area. The diameter of the reservoir and therefore, the diameter of the high energy connection plate 28 is small enough to make the dyed polar liquid $l_1$ within the reservoirs 22 invisible. Therefore, by activating and removing the proper electric fields, an image can be displayed on the electrocapillary display sheet 10.

The voltage required to create an electric field adequate to move the liquid from the reservoirs is in the range between 5 volts and 300 volts.

The electrocapillary display sheet 10 requires a constant application of a pattern of addressing voltages V in order to continuously display an image. An active matrix addressing circuit can provide such a retained voltage pattern.

In order to utilize the electrocapillary display sheet 10 of this invention as a paper surrogate, the bottom surface 60 of sheet 10 has to be either coated with a material of a contrasting color compared to the color of the polar liquid $l_1$ or brought into contact with such a surface. If a light color is selected for the bottom surface 60 and the dyed polar liquid is selected to be dark, the electrodes 18 and 20 with an activated field will appear as dark pixels or subpixels depending on the size of the electrodes 18 and 20. However, the electrodes 18 and 20 with a removed electric field will appear as clear pixels. For example, if the dyed polar liquid $l_1$ is dyed black and the surface 60 is coated white, then the electrodes 18 and 20 with an activated electric field will appear as black on a white background. The electrodes 18 and 20 with a removed electric field will appear as white since the white background can be seen through the clear electrodes 18 and 20. This will have the physical appearance of black ink on white paper.

It should be noted that since the size of the reservoirs are very small in the range between 0.1% and 10% of the area of the pixel, the ink in the receivers is substantially invisible.

Furthermore, the electrocapillary display sheet 10 of this invention can be utilized as a transparent display to be placed on a projector to project the image of the electrocapillary display sheet 10 onto a screen. Therefore, on the screen only the projected image of the electrodes 18 and 20 with an active electric field will be seen as dark pixels or subpixels depending on the size of the electrodes. The electrodes with a removed electric field appear clear and the light passing through these electrodes forms a bright image on the screen.

Figure 12:
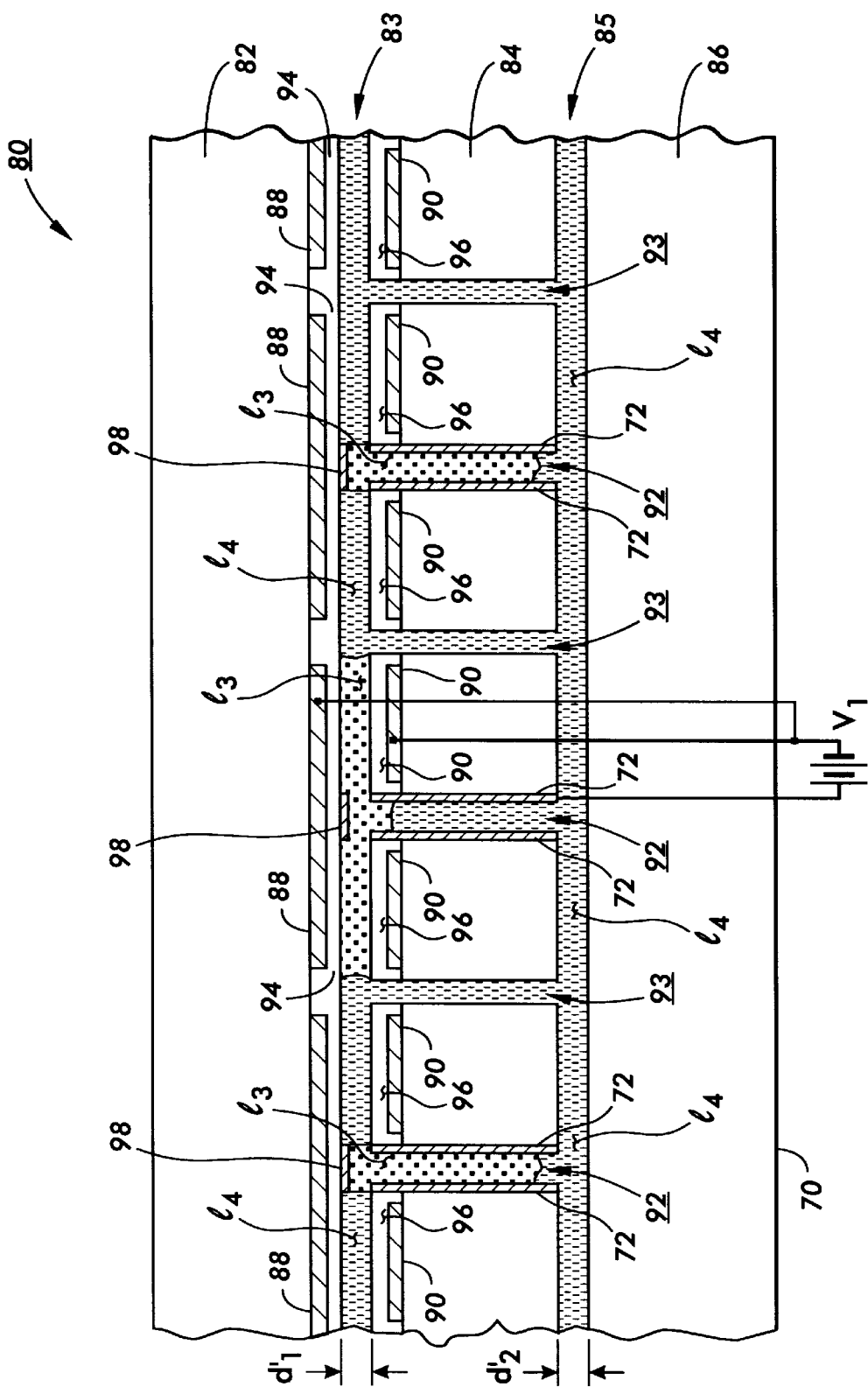
FIG. 12 shows an alternative electrocapillary display sheet of this invention.

Referring to FIG. 12, there is shown yet another alternative electrocapillary display sheet 80 of this invention. In FIG. 12, the elements 82, 83, 84, 85, 86, 88, 90, 92, 93, 94, 96, 98, $l_3$ and $l_4$ are the same and serve the same purpose as the elements 12, 13, 14, 15, 16, 18, 20, 22, 23, 24, 26, 28, $l_1$ and $l_2$ of FIG. 1 respectively. In FIG. 12, the connection plates 98 are no longer used to provide electrical connection to liquid 13. However, they are placed above the reservoirs in order to cause the liquid $l_3$ to rise and adhere to the plates 98. Instead of the connection plates 98, a conductive coating 72 is placed on the walls of the reservoirs 92 via plating or any other well known methods which will be used to provide electrical connection to liquid $l_3$.

In FIG. 12, the voltage $V_1$ is applied to electrodes 88 and 90 and their corresponding liquid $l_3$ through the conductive coating 99. The electrodes 88 and 90 are connected to the same polarity of the voltage $V_1$ and the conductive coating 99 which provides the electrical connection to liquid 13 is connected to the opposite polarity of the voltage $V_1$.

Figure 13:
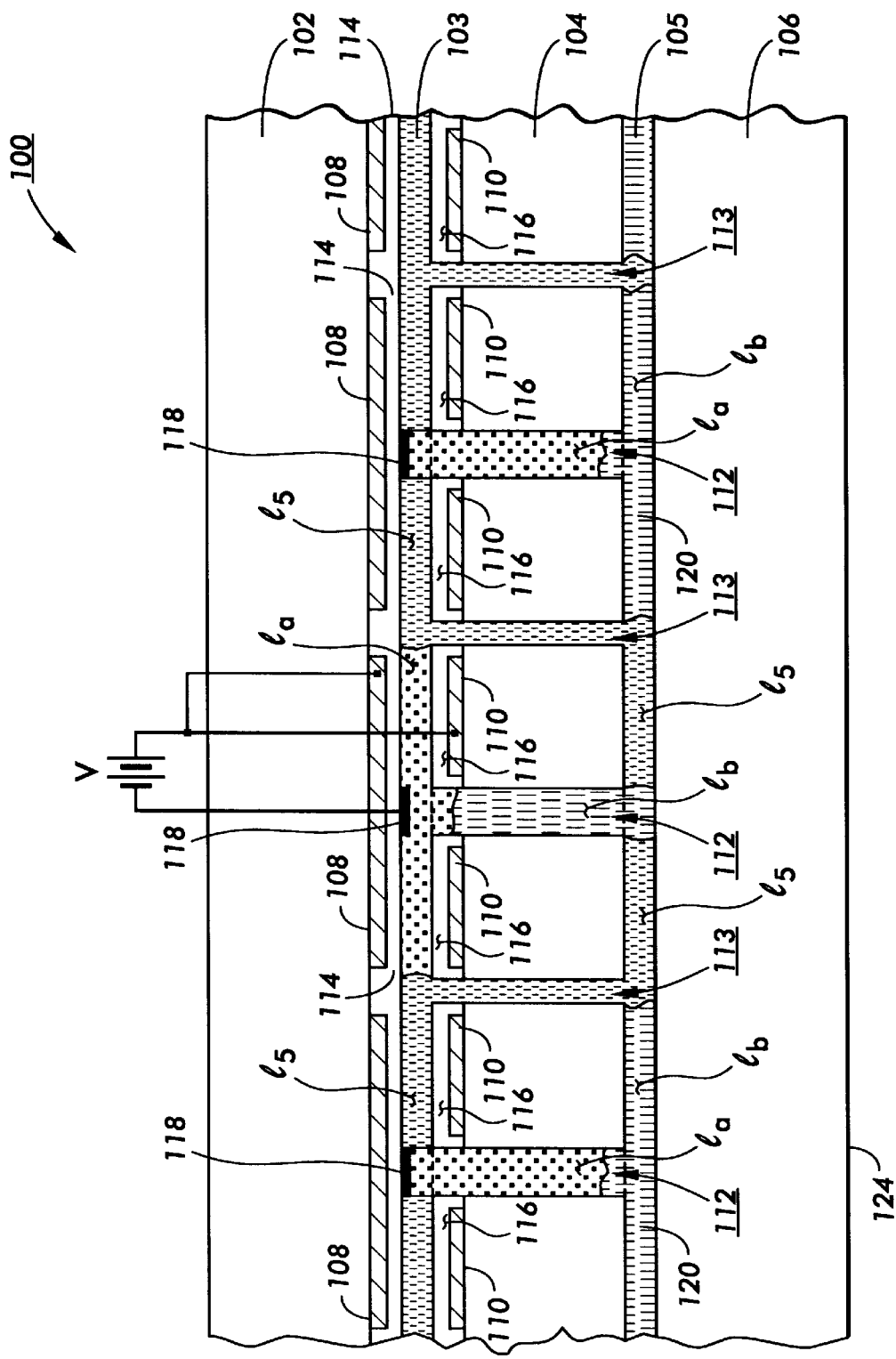
FIG. 13 shows yet an alternative electrocapillary display sheet of this invention.

Referring to FIG. 13, there is shown yet another alternative electrocapillary display sheet 100 of this invention. In FIG. 13, the elements 102, 103, 104, 105, 106, 108, 110, 112, 113, 114, 116, 118 and $l_5$ are the same and serve the same purpose as the elements 12, 13, 14, 15, 16, 18, 20, 22, 23, 24, 26, 28 and $l_2$ of FIG. 1 respectively. In the electrocapillary display sheet 100, liquid $l_1$ of FIG. 1 is replaced by two liquids la and lb. Liquid la is a clear conductive liquid. However, liquid lb is a dyed or pigmented non-conductive liquid. Furthermore, liquids 15, la and lb are all immiscible liquids. Liquid lb is placed under liquid la in such a manner that once liquid la flows into the space 103 only in the area directly between the electrodes 108 and 110 and a portion of the reservoir 112, liquid lb fully retreats into the reservoir 112.

In operation, once a voltage $V_2$ is applied to electrodes 108 and 110 and the connection plate 118, the conductive liquid la which is in contact with connection plate 118 spread into space 103 and fills the space between the electrodes 108 and 110. Once the liquid la flows out of reservoir 112, liquid lb moves into reservoirs 112. In the mean time, the liquid $l_5$ will fill in the space 120 (within the space 105 directly under electrodes 108 and 110). Upon removal of the voltage $V_2$, liquid la retreats back into reservoir 112 and therefore liquid lb flows out to fill the space 120 while pushing out the liquid $l_5$.

A viewer looking at the electrocapillary display sheet from the bottom surface 124, will see the dyed or pigmented liquid lb. within the space 120 when the voltage $V_2$ is removed. Accordingly, the space 120 will be seen as a pixel in the color of liquid lb. However, when the voltage $V_2$ is activated, liquid lb retreats back into the reservoir 112 and clear liquid $l_5$ flows into the space 120. As a result, space 120 will be seen as a clear pixel.

Therefore, the electrocapillary display sheet 100 generates a pixel when an electric field created by an applied voltage $V_2$ is removed and it clears a pixel when an electric field is created by the applied voltage $V_2$. In contrast, the electrocapillary display sheet 10 of FIG. 1 generates a pixel when an electric filed is created by an applied voltage V and clears a pixel when the electric field created by an applied voltage V is removed.

Figure 14:
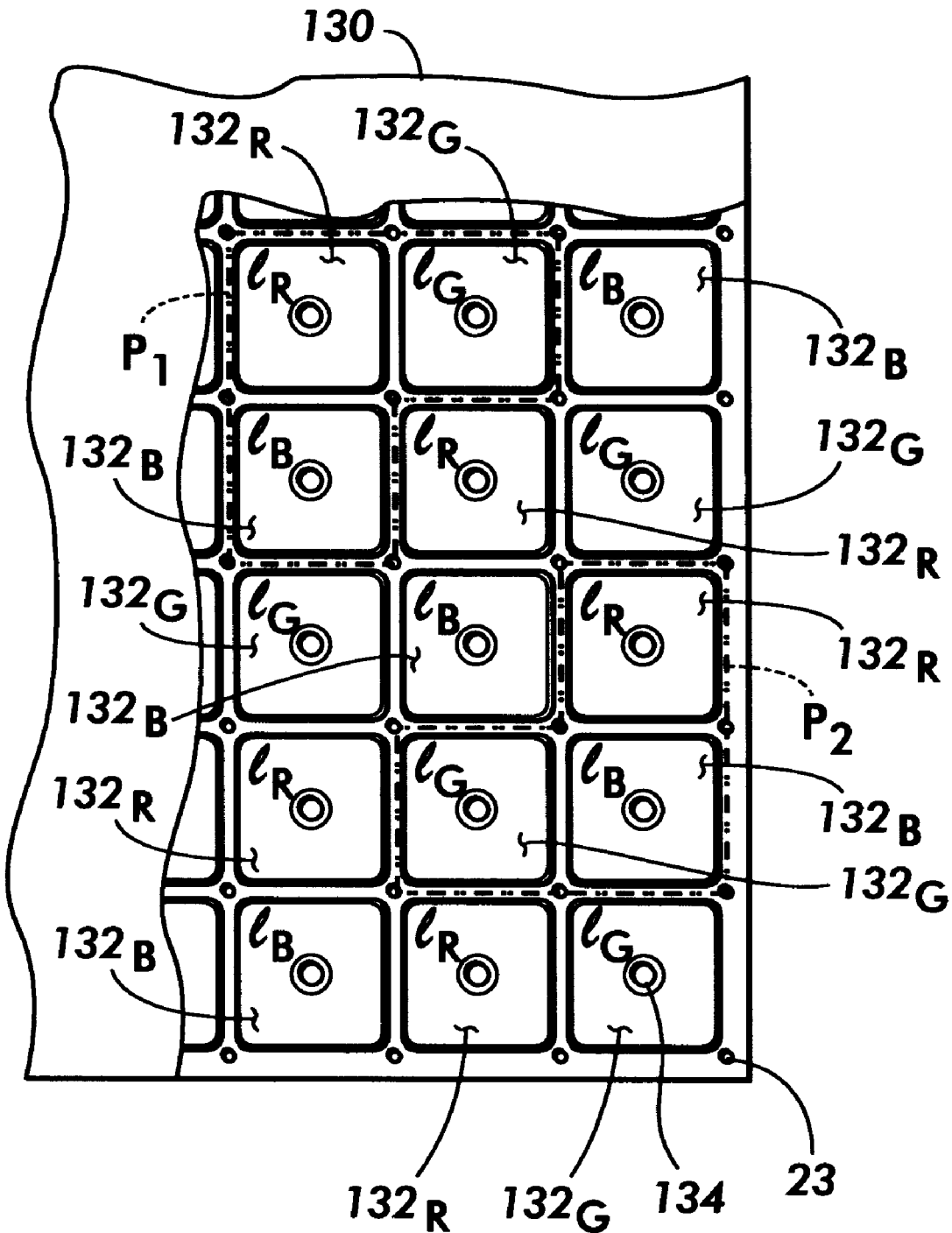
FIG. 14 shows a portion of the top view of a color electrocapillary display sheet of this invention.

The electrocapillary display sheets 10, 80 and 100 can be modified to display full color images. Referring to FIG. 14, there is shown a portion of the top view of a color electrocapillary display sheet 130. In this approach, by decreasing the size of each pair of electrodes 132 and 134 (under the electrode 132) and devoting three pairs of electrodes to each pixel and placing a different color ink (for example, red $l_R$, green $l_G$ and blue $l_B$) in the reservoir of each pair of electrodes, a color electrocapillary display sheet 130 can be generated.

For example, each one of pixels P1 and P2 contains three pairs of electrodes (132$_R$, 134$_R$), (132$_G$, 134$_G$) and (132$_B$, 134$_B$). Electrodes (132$_R$, 134$_R$) contain red ink in their corresponding reservoirs, electrodes (132$_G$, 134$_G$) contain green ink in their their corresponding reservoirs and electrodes (132$_B$, 134$_B$) contain blue ink in their corresponding reservoirs. In this approach once an electric field is applied to each pair of electrode and to the liquid in their corresponding reservoirs, the area under each pair of electrodes will create a different color subpixel and since each pixel has three pairs of electrodes, the combination of the three subpixels will appear as one colored pixel. Therefore, by selecting proper electrodes of each pixel, different colors can be created on each pixel. In this display 130, if the non-conductive liquid (the liquid outside of the reservoirs) is clear, the image will show pastel colors. If the non-conducting liquid is dyed black (for example) and the display is back-lit it will show images with a very wide color gamut.

Still another way of achieving color is to have a stack of 2 or more display sheets, one for each color and in pixel alignment, placed one above another. In this case, subtractive color dyes (cyan, magenta and yellow) are most suitable for use.

It should be noted that in both approaches of color electrocapillary display sheets disclosed in this specification, the red, blue and green inks can be replaced by any three complementary colors which can create the spectrum of colors.

I claim:

1. A display device comprising:
   a first non-conductive sheet;
   a second non-conductive sheet;
   a medial non-conductive sheet being located between said first and said second sheets;
   a first sealed passage means between said first sheet and said medial sheet;
   a second sealed passage means between said medial sheet and said second sheet;
   said medial sheet having a plurality of first holes extending through said medial sheet and opening into each of said passage means;
   said first sheet having a plurality of electrodes;
   said medial sheet having a plurality of electrodes each associated with a corresponding one of said plurality of first holes;
   each one of said plurality of electrodes of said medial sheet facing a corresponding one of said plurality of electrodes of said first sheet and being aligned with said corresponding electrode;
   said medial sheet having a plurality of second holes extending through said medial sheet and opening into each of said passage means for providing a communication path between said first sealed passage means and said second sealed passage means;
   a first liquid means;
   said first liquid means filling at least said plurality of first holes;
   said first liquid means being conductive;
   a plurality of conductive means each being in contact with said first liquid means of a corresponding one of said plurality of first holes for providing electrical connection to said fist liquid means of said corresponding one of said plurality of first holes;
   a first insulating layer insulating said plurality of electrodes of said first sheet from said first liquid means;
   a second insulating layer insulating said plurality of electrodes of said medial sheet from said first liquid means;
   a second liquid means being located at a plurality of locations in said second passage means;
   said second liquid means at each of said plurality of locations associating with a corresponding one of said first holes;
   said second liquid means being non-conductive;
   a fluid means;
   said fluid means filling said second holes of said medial sheet, said first sealed passage means and the remaining portions of said second sealed passage means; and
   said plurality of electrodes of said first sheet, said first insulating layer, said plurality of electrodes of said medial sheet, said second insulating layer, and said plurality of conductive means, being so constructed and arranged relative to each other and said first holes that when one of said plurality of electrodes of said first sheet, a corresponding one of said plurality of electrodes of said medial sheet, and a corresponding one of said plurality of conductive means are activated, an electric field will be generated which will cause said first liquid means in a corresponding one of said plurality of first holes to flow into said first sealed passage means and retreat said second liquid means into said corresponding one of said plurality of first holes causing displacement of adjacent said fluid means through said first and second sealed passage means and corresponding said second holes.

2. The display device recited in claim 1, wherein said second sheet is transparent.

3. The display device as recited in claim 1, wherein each of said plurality of electrodes of said medial sheet completely surrounds a corresponding one of said plurality of said first holes.

4. The display device as recited in claim 3, wherein each of said second holes is surrounded by a plurality of adjacent said electrodes of said medial sheet.

5. The display device as recited in claim 4, wherein said fluid means is a liquid which is immiscible with said first and said second liquid means.

6. The display device as recited in claim 4, wherein said fluid means is a gas.

7. The display device as recited in claim 6, wherein said gas is air.

8. The display device as recited in claim 4, wherein said first insulating layer has a plurality of conductive means, each of said plurality of conductive means is aligned with one of said plurality of first holes.

9. The display device recited in claim 8, wherein said medial sheet is transparent.

10. The display device recited in claim 9, wherein said second sheet is transparent.

11. The display device recited in claim 1, wherein said first liquid means in said first passage means flows back into said first holes of said medial sheet when the electric field is removed and said second liquid means flows back into said second passage means.

12. The display device recited in claim 11, wherein said first liquid means is clear.

13. The display device recited in claim 12, wherein said second liquid means is pigmented.

14. The display device recited in claim 13, wherein said second sheet is transparent.

15. The display device recited in claim 11, wherein said second liquid means is dyed.

16. The display device recited in claim 11, wherein said second sheet is transparent.

* * * * *